(12) United States Patent
Ganguli et al.

(10) Patent No.: US 10,498,604 B2
(45) Date of Patent: Dec. 3, 2019

(54) CAPABILITY DETERMINATION FOR COMPUTING RESOURCE ALLOCATION

(71) Applicant: Intel Corporation, Santa Clara, CA (US)

(72) Inventors: Mrittika Ganguli, Bangalore (IN); Jaiber J. John, Bangalore (IN); Mohan J. Kumar, Aloha, OR (US); Tessil Thomas, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/101,027

(22) PCT Filed: Dec. 31, 2013

(86) PCT No.: PCT/IN2013/000822
§ 371 (c)(1),
(2) Date: Jun. 2, 2016

(87) PCT Pub. No.: WO2015/102008
PCT Pub. Date: Jul. 9, 2015

(65) Prior Publication Data
US 2016/0308723 A1 Oct. 20, 2016

(51) Int. Cl.
*G06F 15/173* (2006.01)
*H04L 12/24* (2006.01)
*H04L 29/08* (2006.01)

(52) U.S. Cl.
CPC .......... *H04L 41/0893* (2013.01); *H04L 41/12* (2013.01); *H04L 67/10* (2013.01)

(58) Field of Classification Search
CPC ... H04L 41/0853; H04L 41/046; H04L 41/52; H04L 69/18

(Continued)

(56) References Cited

U.S. PATENT DOCUMENTS 9,207,988 B2 12/2015 Ganguli et al.
2009/0116404 A1* 5/2009 Mahop ................ H04L 41/0213
370/254

(Continued)

FOREIGN PATENT DOCUMENTS

WO 2011049553 A1 4/2011

OTHER PUBLICATIONS

International Preliminary Report on Patentability and Written Opinion, issued in corresponding PCT Application No. PCT/IN2013/000822, dated Jul. 5, 2016, 8 pages.

(Continued)

*Primary Examiner* — Wing F Chan
*Assistant Examiner* — Andrew Woo
(74) *Attorney, Agent, or Firm* — Grossman, Tucker, Perreault & Pfleger, PLLC

(57) ABSTRACT

The present disclosure is directed to capability determination for computing resource allocation. A device may comprise a management engine (ME) to determine device information for use in generating an enhanced universally unique identifier (UUID) based on a UUID corresponding to the device. The ME may interact with equipment in the device to obtain the device information, and may augment the UUID using at least part of the device information. Device information may include a device media access control (MAC) address, a central processing unit (CPU) identification (ID) for at least one CPU in the device and a device capability ID. The capability ID may be generated utilizing capability information obtained from the equipment, and may be encoded into the capability ID based on tables that describe different capabilities. The device may provide the enhanced UUID to a group agent that may group the device with other devices comprising similar capabilities.

19 Claims, 6 Drawing Sheets

(58) Field of Classification Search
USPC .................................................. 709/223, 221
See application file for complete search history.

(56) References Cited

U.S. PATENT DOCUMENTS

| | | |
|---|---|---|
| 2011/0258621 A1 | 10/2011 | Kern |
| 2013/0082827 A1 | 4/2013 | Cho et al. |
| 2013/0173765 A1* | 7/2013 | Korbecki ......... H04N 21/42209 709/221 |
| 2013/0205028 A1 | 8/2013 | Crockett et al. |
| 2013/0212255 A1 | 8/2013 | Chao et al. |
| 2013/0326215 A1* | 12/2013 | Leggette ............. G06F 17/3023 713/156 |
| 2014/0006597 A1* | 1/2014 | Ganguli ................ G06F 9/5072 709/224 |
| 2016/0164963 A1 | 6/2016 | Ganguil et al. |

OTHER PUBLICATIONS

International Search Report issued in corresponding PCT Application No. PCT/IN2013/000822, dated Jan. 21, 2015, 2 pages.
Leach, P.: "A Universally Unique IDentifier (UUID) URN Namespace", Network Working Group RFC 1717, Internet Society (ISOC) 4, Rue Des Falaises CH-1205 Geneva, Switzerland, Jul. 1, 2005, pp. 1-32.
ITU-T Standard: "Information technology—Procedures for the operation of object identifier registration authorities: Generation of universally unique identifiers and their use in object identifiers", International Telecommunication Union, Geneva, CH, Oct. 14, 2012, 34 pages.
Extended European Search Report issued in European Application No. 13900735.5, dated Jun. 30, 2017, 10 pages.
European Office Action from related matter 13900935.5, dated Aug. 24, 2018, 10 pages.
European Office Action from related matter 13900935.5, dated May 20, 2019.

* cited by examiner

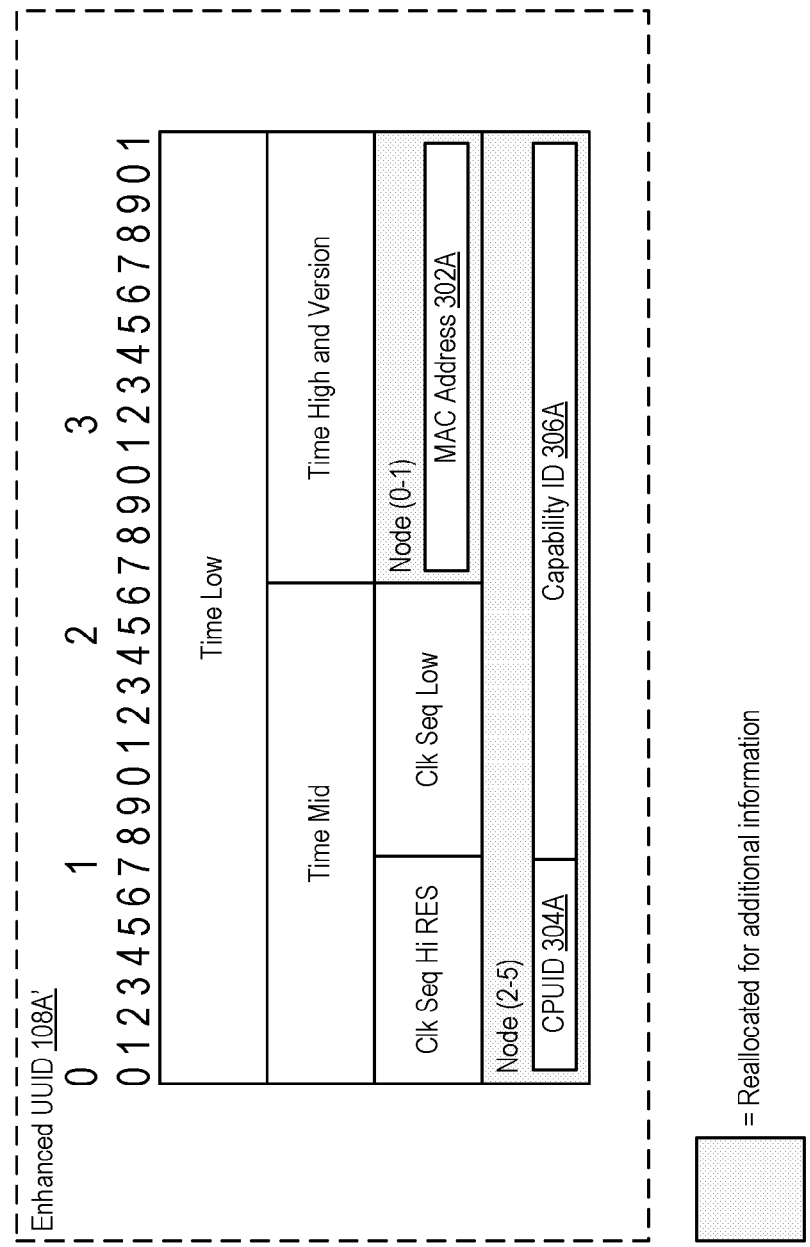

FIG. 4

Capability ID – 64 bits 306A'

| ID Version (8 bits) | Cap1 (8 bits) | Cap2 (8 bits) | Cap3 (8 bits) | Cap4 (8 bits) | Cap5 (8 bits) | Cap6 (8 bits) | Cap7 (8 bits) |
|---|---|---|---|---|---|---|---|

Field Identification 400

| Field | Value | Description |
|---|---|---|
| ID Version | 01 | Version 1 |
| Cap1 | 01 | CPU |
| Cap2 | 02 | Memory |
| Cap3 | 03 | Input/Output (I/O) |
| Cap4 | 04 | Manageability/Board/Chassis |
| Cap5...7 | 00 | Reserved |

Cap1 – CPU Fields 402

| Field | Description |
|---|---|
| 01 | Manufacturer CPU Family ID |
| 02 | Number of Cores |
| 03 | Present/Absence of Trusted Execution Technology |
| 04 | Presence/Absence of Virtualization Technology |
| 05 | Presence/Absence of Crypto Acceleration |
| 06 | Presence/Absence of Vector Capabilities |

Cap2 – Memory Fields 404

| Field | Description |
|---|---|
| 01 | Number of Memory Channels |
| 02 | Channel Capacity |
| 03 | Uniform/Non-uniform Memory Access |
| 04 | Availability of Row Address Strobe |
| 05 | Availability of Mirroring/Sparring |

Cap3 – I/O Fields 406

| Field | Description |
|---|---|
| 01 | Peripheral Component Interconnect Express Version |
| 02 | Universal Serial Bus Version/Capacity |
| 03 | Storage Interfaces |
| 04 | Network Capacity |
| 05 | Virtualization for I/O and Networks |

Cap4 – Manageability/Board Features 408

| Field | Description |
|---|---|
| 01 | Chassis Type |
| 02 | Manageability Features |
| 03 | Other Chipset Features |

FIG. 5

Database 500

| Row Key | Time | ID | IP Address | Metrics | Rank |
|---------|------|-----|------------|---------|------|
|  | T0 | ComputeNode Id => "CN_UUID1", ServerGroupID => "SG_UU ID1", NodePoolID => "NULL" | MCU_add = "10.255.255" BMC_add = "10.255.255" VMM_add = "10.255.255" | Usage => "100" MemBW => "80" Stalls => "40" Cycles => "100" | Availability Rank => "100" QOS Rank => "200" |
|  | T1 | ComputeNode Id => "CN_UUID2" ... | ... | ... | ... |

CAPABILITY DETERMINATION FOR COMPUTING RESOURCE ALLOCATION

TECHNICAL FIELD

The present disclosure relates to computing resource allocation, and more particularly, to a system for conveying computing resource capability data for use in resource allocation.

BACKGROUND

Advances in computing and communication technology have facilitated the growth of distributed computing. For example, processing and storage operations that were previously handled on a local basis have now moved to the "cloud." An example of a cloud-computing solution may comprise at least one computing device (e.g., a server) accessible via a local-area network (LAN), a wide-area network (WAN) like the Internet, a global area network (GAN), etc. Smaller applications of cloud computing may include individual users storing data in a cloud repository, executing applications from a cloud provider, etc. to leverage the ability to access the data or applications using a variety of devices from a variety of locations, for the security of having the data and/or applications stored in a remotely-situated redundant system, etc. Large scale applications of cloud computing may involve offloading the entire computing infrastructure for an enterprise to a secondary provider. As a result, the enterprise may continue to operate in as usual without having to maintain its own computing resources.

As the trend towards cloud computing continues to grow, the organization of cloud computing resources becomes more challenging. Large enterprises including, for example, businesses, educational institutions, governmental entities, medical provider networks, etc. have variable computing requirements. As these enterprises evolve, so do their computing needs. As a result, the resources used to support these various enterprises may be a mix of hundreds or even thousands of computing devices from various manufacturers, in various configurations, with various installation dates, in various facilities, etc. The configuration, installation, service life, etc. of a certain computing device may dictate its capabilities, and may make it more appropriate for performing certain tasks over others. Organizing such a large number and variety of computing devices into effective functional groups becomes a substantial computing task in itself, making it very difficult to leverage common capabilities.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 3 illustrates an example structure for an enhanced universally unique identifier (UUID) in accordance with at least one embodiment of the present disclosure;

FIG. 4 illustrates an example capability identification (ID) in accordance with at least one embodiment of the present disclosure;

FIG. 5 illustrates an example server capability database entry in accordance with at least one embodiment of the present disclosure.

Figure 1:
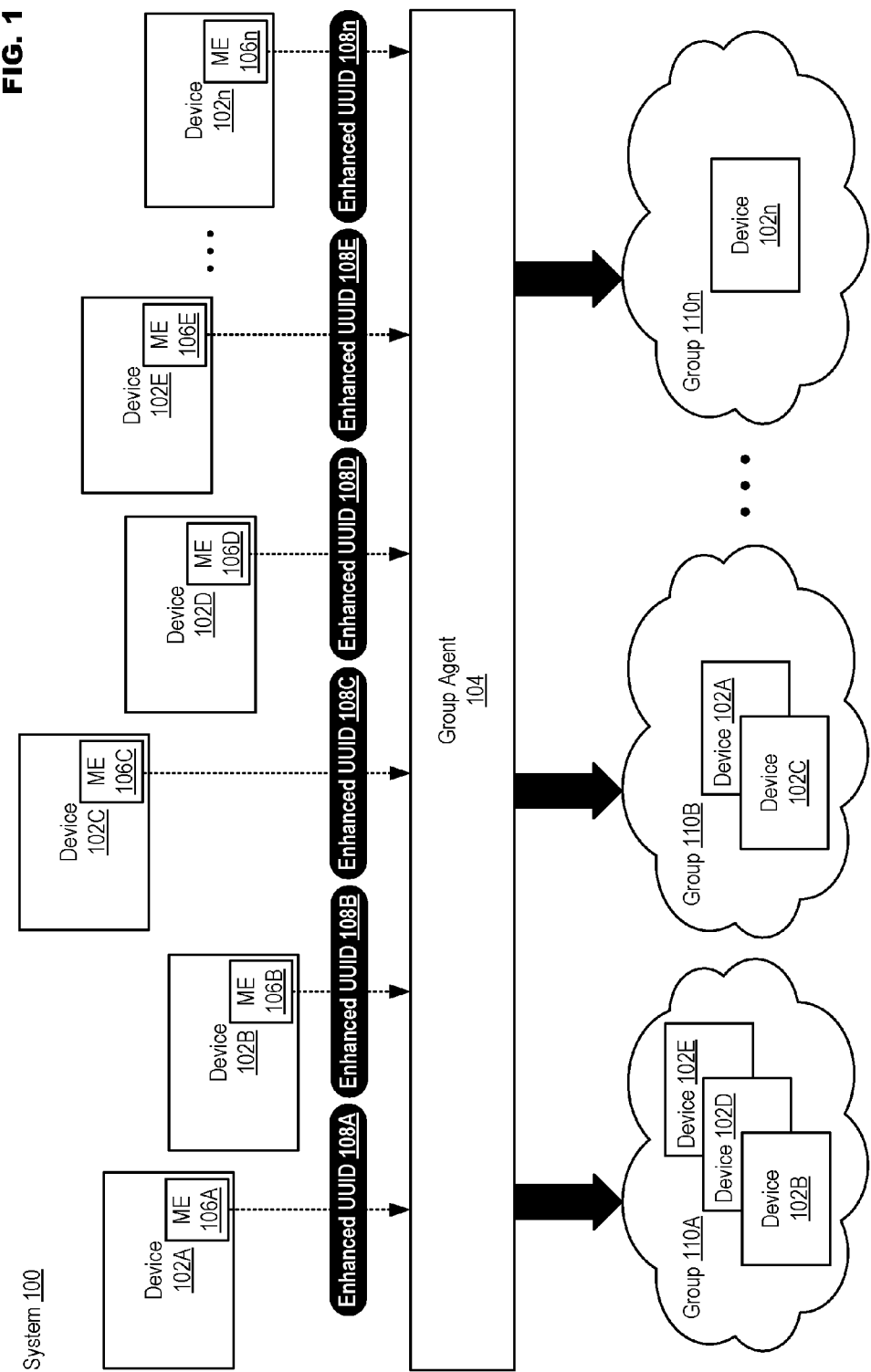
FIG. 1 illustrates an example of capability determination for computing resource allocation in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present disclosure is directed to capability determination for computing resource allocation. A device may comprise at least a management engine (ME) to determine device information for use in generating an enhanced universally unique identifier (UUID) based on a UUID corresponding to the device. For example, the ME may interact with equipment in the device to obtain the device information and may then proceed to insert at least part of the device information into fields in the UUID. Device information may include, for example, a media access control (MAC) address associated with the device, a central processing unit (CPU) identification (ID) associated with at least one CPU in the device and a capability ID determined for the device. The capability ID may be generated using capability information obtained from the interaction, and may be encoded into the capability ID based on tables that describe the capabilities of the equipment. The device may also provide the enhanced UUID to a group agent that may group the device with other devices comprising similar capabilities. These groups may be selected to leverage the processing power of similarly capable devices.

In one embodiment, a device for use with a computing resource allocation system may comprise, for example, a processing module, a memory module, a communication module and a ME. The processing module may be to process data. The memory module may be to store data. The communication module may be to communicate with at least a group agent. The ME may be to determine device information based on interaction with at least the processing module and memory module, determine a universally unique identifier associated with the device and generate an enhanced universally unique identifier by incorporating at least part of the device information into the universally unique identifier.

For example, the ME incorporating the at least part of the device information into the universally unique identifier may comprise the management engine inserting the at least part of the device information into node fields within the universally unique identifier. The at least part of the device information may comprise, for example, at least a media access control address associated with the device. The at least part of the device information may also comprise at least part of at least one central processing unit identifier associated with at least one central processing unit in the processing module. The at least part of the device information may also comprise a capability identifier generated by the management engine based on the interaction. The capability identifier may be based on capability information received by the management engine during the interaction, the capability identifier being divided into segments with at least one segment corresponding to a capability table. The capability table may comprise entries describing device capabilities, the value of the at least one segment indicating an entry in the capability table. Device capabilities may comprise at least one of processing module capabilities, memory module capabilities, input/output capabilities, manageability features or board-related features.

In the same or another embodiment, the management engine may further be to cause the communication module to transmit the enhanced universally unique identifier to the group agent. The group agent may be to determine capabilities for the device based on the enhanced universally unique identifier and assign the device to at least one group based on the capabilities determined from the enhanced universally unique identifier. A method for communicating device capability information consistent with the present disclosure may comprise, for example, determining device information in a device, determining a universally unique identifier associated with the device and generating an enhanced universally unique identifier by incorporating at least part of the device information into the universally unique identifier.

FIG. 1 illustrates an example of capability determination for computing resource allocation in accordance with at least one embodiment of the present disclosure. System 100 may comprise, for example, device 102A, device 102B, device 102C, device 102D, device 102E . . . device 102n (collectively "devices 102A . . . n") and group agent 104. Examples that may be employed in the specification to explain various embodiments consistent with the present disclosure may refer to devices 102A . . . n as servers organized in a cloud-computing configuration, which may be an example operational scenario to which these embodiments may be applicable. However, examples of devices 102A . . . n may further include, but are not limited to, a mobile communication device such as a cellular handset or a smartphone based on the Android® OS, iOS®, Windows® OS, Mac OS, Tizen OS, Firefox OS, Blackberry® OS, Palm® OS, Symbian® OS, etc., a mobile computing device such as a tablet computer like an iPad®, Surface®, Galaxy Tab®, Kindle Fire®, etc., an Ultrabook® including a low-power chipset manufactured by Intel Corporation, a netbook, a notebook, a laptop, a palmtop, etc., a typically stationary computing device such as a desktop computer, a smart television, small form factor computing solutions (e.g., for space-limited applications, multimedia applications like television integrated media servers, etc.) like the Next Unit of Computing (NUC) platform from the Intel Corporation, etc.

As set forth above, devices 102A . . . n may be servers organized in a cloud-computing configuration. A cloud-computing configuration may include devices 102A . . . n being servers accessible via a network connection (e.g., LAN, WAN, GAN, etc.) that may be configured to operate alone or in combination with other servers to process jobs received from a requestor. The fact that devices 102A . . . n may be organized in a cloud-computing configuration may be important from the standpoint that, regardless of physical location, devices 102A . . . n may be organized by, for example, group agent 104 into various operational groups such as 110A, 110B . . . 110n (collectively, "groups 110A . . . n") for leveraging common capabilities amongst the group members. Group agent 104 may be, for example, part of a solution for scalable group management middleware to assist cloud schedulers with efficient workload scheduling. For example, group agent 104 may be a middle layer configured to form groups 110A . . . n based on the capabilities of devices 102A . . . n. Group agent 104 may reside between a zone middleware library (not pictured) for managing devices 102A . . . n and host management agents residing in the OS/Virtual Machine Manager (VMM) node of devices 102A . . . n along with ME 106A, 106B, 106C, ME 106D, ME 106E . . . ME 106n (collectively, ME 106A . . . n).

ME 106A . . . n may comprise hardware (e.g., firmware) and/or software configured to manage devices 102A . . . n in regard to, for example, device performance, security, etc. In one embodiment, ME 106A . . . n may also be configured to generate and provide enhanced UUID 108A, enhanced UUID 108B, enhanced UUID 108C, enhanced UUID 108D, enhanced UUID 108E . . . enhanced UUID 108n (collectively, "enhanced UUIDs 108A . . . n) to group agent 104 for devices 102A . . . n. Enhanced UUIDs 108 A . . . n may comprise, for example, device information that may be used by group agent 104 to determine at least one group 110A . . . n with which each device 102 A . . . n may be associated. The device information may come from disparate sources within devices 102A . . . n that, without the contribution of ME 106A . . . n, would not be readily available to group agent 104. For example, devices 102B, 102D and 102E may be associated with group 110A based on processing power, memory configuration, processing, security and/or management features, etc. Likewise, group 110B may comprise at devices 102A and 102C and group 110n may comprise at least device 102n. The association of devices 102A . . . n with these groups 110A . . . n may help to leverage the abilities of certain devices 102A . . . n for certain jobs. For example, group 110A may include high power and high availability servers for processing large jobs, group 110B may include enhanced security servers for processing jobs including sensitive information, etc. As new devices 102A . . . n become available (e.g., new servers are added to racks in server farms, older servers are replaced, etc.) ME 106A . . . n may be able to obtain device information for the new devices 102A . . . n and generate enhanced UUID 108A . . . n so that the new devices 102A . . . n may be quickly associated with a group of devices having similar capabilities.

Figure 2:
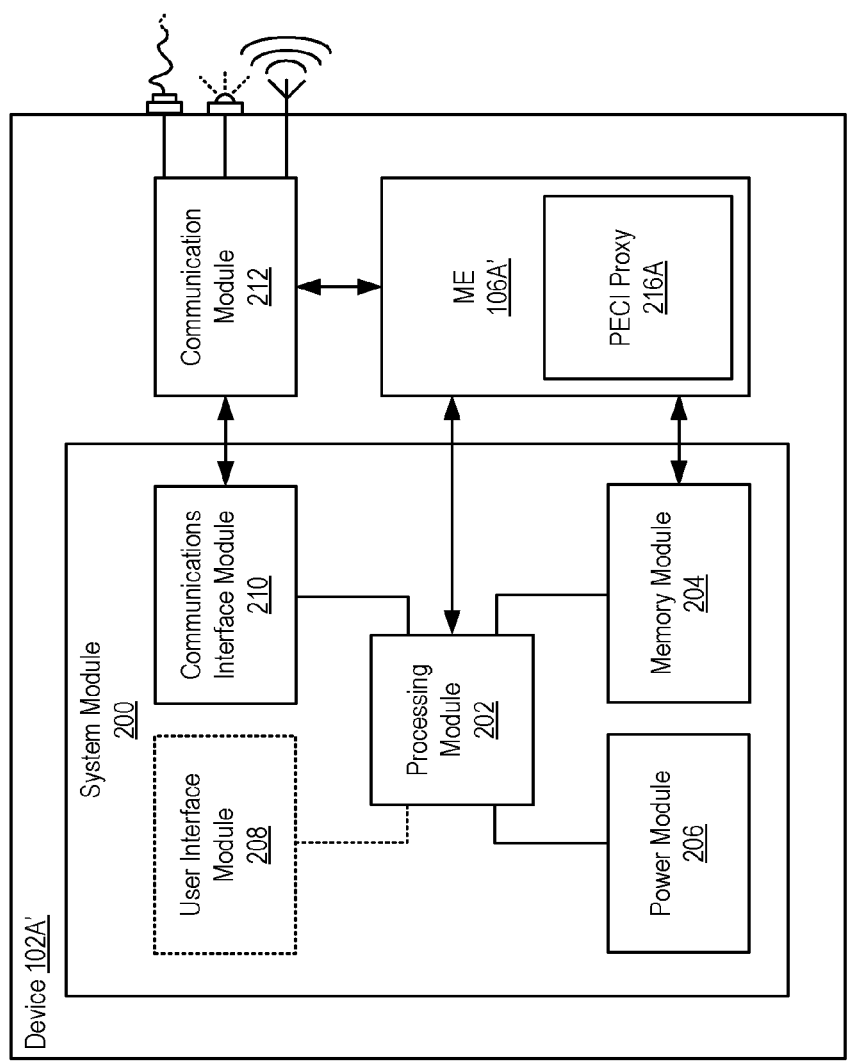
FIG. 2 illustrates an example configuration for a device in accordance with at least one embodiment of the present disclosure.

FIG. 2 illustrates an example configuration for a device in accordance with at least one embodiment of the present disclosure. Device 102A' may be capable of performing some or all of the example functionality shown in FIG. 1. However, device 102A' is meant only as an example of equipment usable in various embodiments consistent with the present disclosure, and is not meant to limit these various embodiments to any particular manner of implementation. Moreover, the example configuration illustrated for device 102A' in FIG. 2 may also be applicable to similarly situated devices 102B . . . n further disclosed in FIG. 1.

Device 102' may comprise system module 200 to manage general device operations. System module 200 may include, for example, processing module 202, memory module 204, power module 206, user interface module 208 and communication interface module 210. Device 102' may also include at least communication module 212 and ME 106A'. While communication module 212 and ME 106A' have been shown separately from system module 200, the example implementation of device 102' has been provided merely for the sake of explanation herein. Some or all of the functionality associated with communication module 212 and/or ME 106A' may also be incorporated within system module 200.

In device 102A', processing module 202 may comprise one or more processors situated in separate components, or alternatively, may comprise one or more processing cores embodied in a single component (e.g., in a System-on-a-

Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in device 102A'. Some or all of the functionality commonly associated with the support circuitry may also be included in the same physical package as the processor (e.g., such as in the Sandy Bridge family of processors available from the Intel Corporation).

Processing module 202 may be configured to execute various instructions in device 102A'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) or read-only memory (ROM) in a fixed or removable format. RAM may include memory configured to hold information during the operation of device 102A' such as, for example, static RAM (SRAM) or Dynamic RAM (DRAM). ROM may include memories such as Bios or Unified Extensible Firmware Interface (UEFI) memory configured to provide instructions when device 102A' activates, programmable memories such as electronic programmable ROMs (EPROMS), Flash, etc. Other fixed and/or removable memory may include magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), etc.

Power module 206 may include internal power sources (e.g., a battery) and/or external power sources (e.g., electromechanical or solar generator, power grid, fuel cell, etc.), and related circuitry configured to supply device 102A' with the power needed to operate. User interface module 208 may be optional in that some devices 102A' (e.g., servers) may not comprise user interface equipment/software, but may instead rely upon user interface resources in another device (e.g., a control terminal) to facilitate interaction between a user and device 102A'. User interface module 208 may include equipment and/or software to allow users to interact with device 102A' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, etc.) and various output mechanisms (e.g., speakers, displays, lighted/flashing indicators, electromechanical components for vibration, motion, etc.). The equipment in user interface module 208 may be incorporated within device 102A' and/or may be coupled to device 102A' via a wired or wireless communication medium.

Communication interface module 210 may be configured to handle packet routing and other control functions for communication module 212, which may include resources configured to support wired and/or wireless communications. Wired communications may include serial and parallel wired mediums such as, for example, Ethernet, Universal Serial Bus (USB), Firewire, Digital Video Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), optical character recognition (OCR), magnetic character sensing, etc.), short-range wireless mediums (e.g., Bluetooth, WLAN, Wi-Fi, etc.) and long range wireless mediums (e.g., cellular wide-area radio communication technology, satellite-based communications, etc.). In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission.

In the embodiment shown in FIG. 2, ME 106A' may be configured to interact with at least processing module 202, memory module 204 and/or communication module 212. In an example of operation, boot code stored within nonvolatile memory in memory module 202 may execute boot code upon startup of device 102A'. During the execution of the boot code, device information used to configure device 102A' during initialization may be set in various modules in device 102A' including, for example, processing module 202, memory module 204 and other hardware resources in device 102A'. The device information stored in these modules may be later accessed by ME 106A' for use in generating enhanced UUID 108A. For example, the boot code may further read a UUID for the device generated based on a MAC address, may retrieve the CPUID and may generate a server ID. In one embodiment, during execution of the boot code (e.g., BIOS POST), a specialized boot code module may collect relevant information from the boot code internal data structure and/or device registers/model-specific registers (MSRs) and assembles the capability ID. The capability ID may then be transferred to ME 106A' via mailbox mechanisms and to the OS through in-memory tables before handover. In one embodiment, ME 106A' may include a platform environment control interface (PECI) proxy 216A to interact with at least processing module 202 and memory module 204. The device information obtained by PECI proxy 216A may then be utilized to generate enhanced UUID 108A. ME 106A' may cause communication module 212 to transmit enhanced UUID 108A to group agent 104 so device 102A' may be associated with at least one group based on capabilities learned from enhanced UUID 108A.

FIG. 3 illustrates an example structure for an enhanced UUID in accordance with at least one embodiment of the present disclosure. In general, enhanced UUID 108A' may be based on the UUID standard standardized by the by the Open Software Foundation (OSF) as part of the Distributed Computing Environment (DCE). A UUID may allow devices to be uniquely identified without centralized administration. A UUID may be formulated in a variety different manners depending on the version, however, in general it may be calculated based on an assortment of data that is likely to arrive at a 16 octet (128-bit) number with a unique value Enhanced UUID 108A' demonstrates that a UUID may be formulated using a variety of timestamps and other information like version (e.g., Time Low, Time Mid, Time High and Version, Clk Seq Hi RES and Clk Seq Low) to generate a truly unique identifier.

A UUID may further reserve space for node information (e.g., Node (0-1) and Node (2-5) as shown in enhanced UUID 108A'). In one embodiment, the reserved space for node information may be reallocated for use in generating enhanced UUID 108A'. For example, media access control (MAC) address 302A and at least some data derived from CPUID 304A and/or capability ID 306A may be inserted into the reserved node space to provide data useful for evaluating the capabilities of device 102A. MAC address 302A may be utilized by group agent 104 to, for example, identify device 102A on a network. The portions of CPUID 304A included in enhanced UUID 108A' may include, for example, vendor ID, model, cache description and at least some basic feature data. The processor-related data may be employed by group agent 104 to determined abilities and/or limitations for device 102A prior to group association. Capability ID 306A may provide similar capability data as CPUID 304A but pertaining to the entire device 102A. An example capability ID 306A is disclosed in FIG. 4.

FIG. 4 illustrates an example capability ID in accordance with at least one embodiment of the present disclosure. In one embodiment, capability ID 306A' may include 64 bits separated into eight (8) octets. Each of octet may correspond to a different capability category described in example tables 400 to 408. Tables 400 to 408 may be standardized so that the information in capability ID 306' may simply indicate entries in the tables, and thus, the amount of data required to actually be included in capability ID 306' may be minimized. For example, the first octet may generally describe the contents of the following octets. The value of the ID version octet may indicate, in accordance with table 400, the ID version of capability ID 306A', that capability 1 (Cap1) describes CPU capabilities, capability 2 (Cap2) describes memory capabilities, capability 3 (Cap3) describes input/output (I/O) capabilities, capability 4 (Cap4) describes manageability/board/chassis capabilities and capability fields 5 to 7 (Cap5 . . . 7) may be reserved for future use.

Tables 402 to 408 may then be employed to determine various capabilities for device 102A based on the value of the octets in capability ID 106A'. For example, the bits in Cap1 may describe the manufacturer CPU Family ID of at least one processor in device 102A, the number of cores in the processor, the presence or absence of trusted execution technology (TXT), the presence or absence of virtualization technology (VT), the presence or absence of crypto acceleration, the presence or absence of vector capabilities, etc. based on table 402. The bits in Cap2 may describe the number of memory channels in device 102A (e.g., in memory module 204), channel capacity, the availability of uniform memory access (UMA) or non-uniform memory access (NUMA), the availability of row address strobe (RAS), the available of mirroring/sparring in device 102A, etc. based on table 404. The bits in Cap3 may describe a peripheral component interconnect (PCI) bus version in device 102A, a universal serial bus (USB) version in device 102A, storage interfaces (e.g., serial advanced technology attachment (SATA), external SATA (eSATA), small computer system interface (SCSI), serially attached SCSI (SAS), fiber channel electrical interface (FC), etc.) based on table 406. The bits in Cap4 may describe the chassis type for device 102A, the manageability features in device 102A and/or other chipset features in device 102A based on table 408. In this manner, capability information corresponding to device 102A may be communicated in a compact manner that may be readily understood and processed by group agent 104.

FIG. 5 illustrates an example server capability database entry in accordance with at least one embodiment of the present disclosure. In one embodiment, group agent 104 acting alone or as part of a zone management solution may comprise at least one centralized server to create a UUID for the server group and zone, and may employ at least one database to link hierarchy information. For example, a database model for a 10,000 server domain controller (DC) may utilize at least three relational database management system (RDBMS) tables in the zone with 3-4 columns of time-stamped data and two RDBMS tables of six columns of time-stamped data. To improve the scalability of data collection, storage and retrieval of the RDBMS tables may be restructured into column family tables within a distributed database. A hierarchy of Zone→Group→Node with unique IDs may be maintained at each level as data may be accessed at any location. Example query time for an RDBMS data search takes at least $O(n^2)$, while a binary search in distributed database will be $O(n\log n)$. At least one objective consistent with the present disclosure is to reduce implementation of an extensive data base solution, reduce execution time to $O(1)$ by providing a search key to a NOSQL database (e.g., generated by the zone management solution). An example NOSQL database table 500 utilizing enhanced UUID as a source for capability information is shown in FIG. 5.

Figure 6:
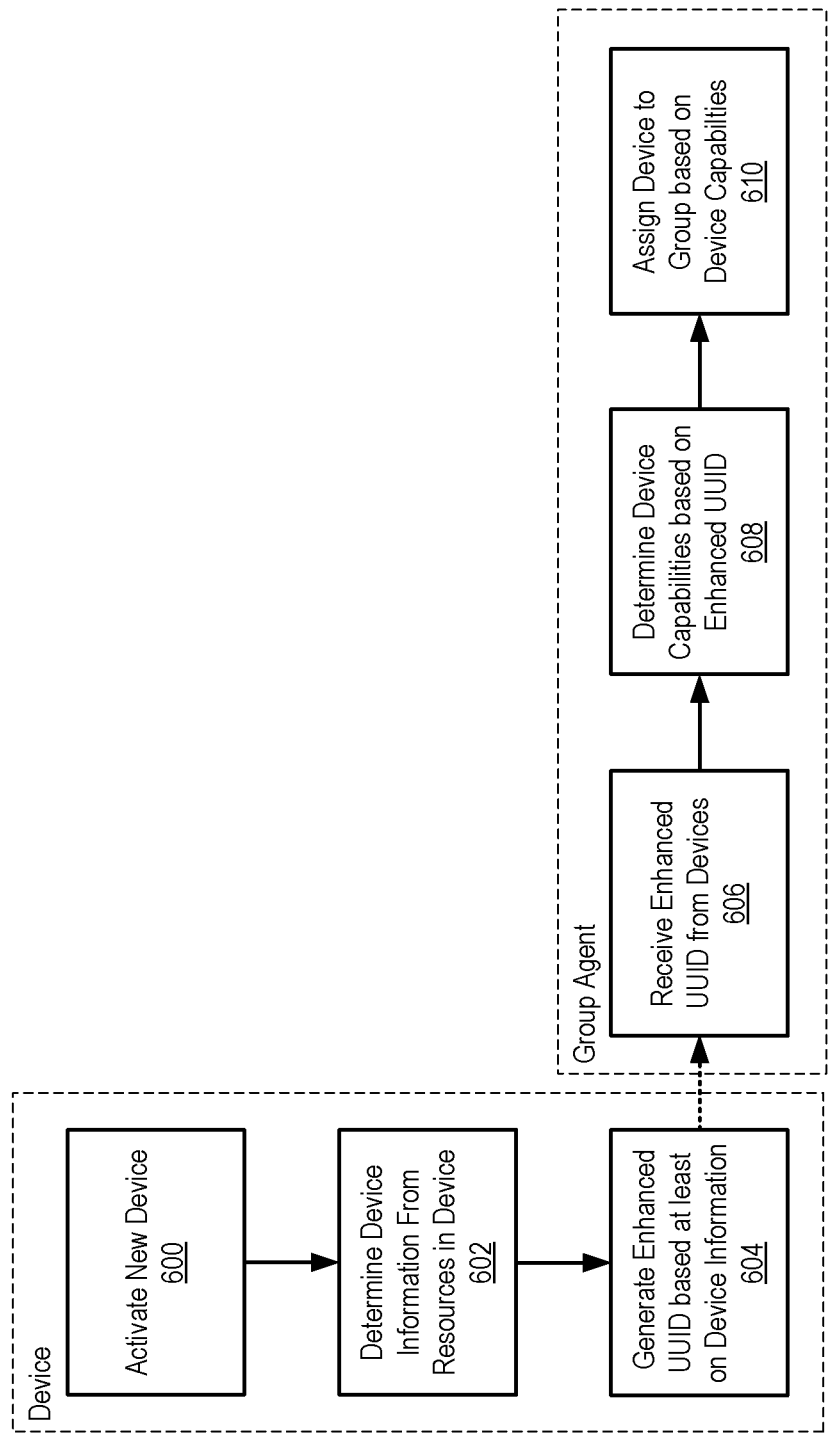
FIG. 6 illustrates example operations for of capability determination for computing resource allocation in accordance with at least one embodiment of the present disclosure.

FIG. 6 illustrates example operations for of capability determination for computing resource allocation in accordance with at least one embodiment of the present disclosure. In one embodiment, operations 600 to 604 may be performed by a device while operations 606 to 610 may be performed by a group agent. In operation 600 a new device may be activated. Activation of the new device may include making the device available on a network for the first time, adding the device to an existing data processing infrastructure (e.g., adding a new server to a server rack), etc. In operation 602, device information may be determined based on interaction with various resources in the device. For example, an ME in the device may interact with at least processing and memory resources in the device. Device information may comprise, for example, a device MAC address and at least some information from a CPUID (e.g., corresponding to at least one CPU in the device) and/or a capability ID. An enhanced UUID may then be generated based on the device information in operation 604.

The group agent may receive the enhanced UUID from the device in operation 606. For example, the group agent may request a UUID from at least all newly added devices on a periodic basis, on the occurrence of an event, etc. In operation 608 the group agent may then determine device capabilities based on the device information incorporated into the enhanced UUID. After the capabilities of the device have been determined, in operation 610 the group agent may assign the device to at least one group based on the device capabilities determined in operation 608. For example, the device may be assigned to a group of devices including the same or similar capabilities to leverage the common capabilities for group processing.

While FIG. 6 illustrates operations according to an embodiment, it is to be understood that not all of the operations depicted in FIG. 6 are necessary for other embodiments. Indeed, it is fully contemplated herein that in other embodiments of the present disclosure, the operations depicted in FIG. 6, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure is directed to capability determination for computing resource allocation. A device may comprise a management engine (ME) to determine device information for use in generating an enhanced universally unique identifier (UUID) based on a UUID corresponding to the device. The ME may interact with equipment in the device to obtain the device information, and may augment the UUID using at least part of the device information. Device information may include a device media access control (MAC) address, a central processing unit (CPU) identification (ID) for at least one CPU in the device and a device capability ID. The capability ID may be generated utilizing capability information obtained from the equipment, and may be encoded into the capability ID based on tables that describe different capabilities. The device may provide the enhanced UUID to a group agent that may group the device with other devices comprising similar capabilities.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for capability determination for computing resource allocation, as provided below.

According to example 1 there is provided a device for use with a computing resource allocation system. The device may comprise a processing module to process data, a memory module to store data, a communication module to communicate with at least a group agent and a management engine to determine device information based on interaction with at least the processing module and memory module, determine a universally unique identifier associated with the device and generate an enhanced universally unique identifier by incorporating at least part of the device information into the universally unique identifier.

Example 2 may include the elements of example 1, wherein the management engine incorporating the at least part of the device information into the universally unique identifier comprises the management engine inserting the at least part of the device information into node fields within the universally unique identifier.

Example 3 may include the elements of any of examples 1 or 2, wherein the at least part of the device information comprises at least a media access control address associated with the device.

Example 4 may include the elements of any of examples 1 or 2, wherein the at least part of the device information comprises at least part of at least one central processing unit identifier associated with at least one central processing unit in the processing module.

Example 5 may include the elements of any of examples 1 or 2, wherein the at least part of the device information comprises a capability identifier generated by the management engine based on the interaction.

Example 6 may include the elements of example 5, wherein the capability identifier is based on capability information received by the management engine during the interaction, the capability identifier being divided into segments with at least one segment corresponding to a capability table.

Example 7 may include the elements of any of example 6, wherein the capability information is collected by a platform environment control interface proxy in the management engine.

Example 8 may include the elements of example 7, further comprising boot code to provide the capability information to the platform environment control interface proxy during initialization of the device.

Example 9 may include the elements of example 6, wherein the capability table comprises entries describing device capabilities, the value of the at least one segment indicating an entry in the capability table.

Example 10 may include the elements of example 9, wherein device capabilities comprise at least one of processing module capabilities, memory module capabilities, input/output capabilities, manageability features or board-related features.

Example 11 may include the elements of any of examples 1 or 2, wherein the management engine is further to cause the communication module to transmit the enhanced universally unique identifier to the group agent.

Example 12 may include the elements of any of examples 11, wherein the group agent is to determine capabilities for the device based on the enhanced universally unique identifier and assign the device to at least one group based on the capabilities determined from the enhanced universally unique identifier.

Example 13 may include the elements of example 12, wherein the group agent comprises at least one database employed to assign the device to the at least one group, the database being populated with the capabilities determined from the enhanced universally unique identifier.

Example 14 may include the elements of any of examples 1 or 2, wherein the at least part of the device information comprises at least one of a media access control address associated with the device, at least part of at least one central processing unit identifier associated with at least one central processing unit in the processing module or a capability identifier generated by the management engine based on the interaction.

Example 15 may include the elements of example 14, wherein the capability identifier is based on capability information received by the management engine during the interaction, the capability identifier being divided into segments with at least one segment corresponding to a capability table comprising entries describing device capabilities.

According to example 16 there is provided a method for communicating device capability information. The method may comprise determining device information in a device, determining a universally unique identifier associated with the device and generating an enhanced universally unique identifier by incorporating at least part of the device information into the universally unique identifier.

Example 17 may include the elements of example 16, wherein incorporating the at least part of the device information into the universally unique identifier comprises inserting the at least part of the device information into node fields within the universally unique identifier.

Example 18 may include the elements of any of examples 16 to 17, wherein the at least part of the device information comprises at least a media access control address associated with the device.

Example 19 may include the elements of any of examples 16 to 17, wherein the at least part of the device information comprises at least part of at least one central processing unit identifier associated with at least one central processing unit in the device.

Example 20 may include the elements of any of examples 16 to 17, wherein the at least part of the device information comprises a capability identifier generated in the device.

Example 21 may include the elements of example 20, and further comprises receiving capability information used to generate the capability identifier from boot code in the device executed during device initialization.

Example 22 may include the elements of example 20, wherein the capability identifier is divided into segments with at least one segment corresponding to a capability table.

Example 23 may include the elements of example 22, wherein the capability table comprises entries describing device capabilities, the value of the at least one segment indicating an entry in the capability table.

Example 24 may include the elements of example 23, wherein device capabilities comprise at least one of processing module capabilities, memory module capabilities, input/output capabilities, manageability features or board-related features.

Example 25 may include the elements of any of examples 16 to 17, and further comprises causing the enhanced universally unique identifier to be transmitted to a group agent.

Example 26 may include the elements of example 25, and further comprises determining, in the group agent, capabilities for the device based on the enhanced universally unique identifier and assigning, in the group agent, the device to at least one group based on the capabilities determined from the enhanced universally unique identifier.

Example 27 may include the elements of any of examples 16 to 17, wherein the at least part of the device information comprises at least one of a media access control address associated with the device, at least part of at least one central processing unit identifier associated with at least one central processing unit in the device or a capability identifier generated in the device.

Example 28 may include the elements of example 27, wherein the capability identifier is divided into segments with at least one segment corresponding to a capability table comprising entries describing device capabilities.

According to example 29 there is provided a system including a device, the system being arranged to perform the method of any of the above examples 16 to 28.

According to example 30 there is provided a chipset arranged to perform the method of any of the examples 16 to 28.

According to example 31 there is provided at least one machine readable medium comprising a plurality of instructions that, in response to be being executed on a computing device, cause the computing device to carry out the method according to any of the above examples 16 to 28.

According to example 32 there is provided a device configured for use in a computing resource allocation system, the device being arranged to perform the method of any of the above examples 16 to 28.

According to example 33 there is provided a system for communicating device capability information. The system may comprise means for determining device information in a device, means for determining a universally unique identifier associated with the device; and means for generating an enhanced universally unique identifier by incorporating at least part of the device information into the universally unique identifier.

Example 34 may include the elements of example 33, wherein incorporating the at least part of the device information into the universally unique identifier comprises inserting the at least part of the device information into node fields within the universally unique identifier.

Example 35 may include the elements of any of examples 33 to 34, wherein the at least part of the device information comprises at least a media access control address associated with the device.

Example 36 may include the elements of any of examples 33 to 34, wherein the at least part of the device information comprises at least part of at least one central processing unit identifier associated with at least one central processing unit in the device.

Example 37 may include the elements of any of examples 33 to 34, wherein the at least part of the device information comprises a capability identifier generated in the device.

Example 38 may include the elements of example 37, wherein the capability identifier is divided into segments with at least one segment corresponding to a capability table comprising entries describing device capabilities.

Example 39 may include the elements of any of examples 33 to 34, and further comprises means for causing the enhanced universally unique identifier to be transmitted to a group agent.

Example 40 may include the elements of example 39, and further comprises means for causing determining, in the group agent, capabilities for the device based on the enhanced universally unique identifier and means for causing assigning, in the group agent, the device to at least one group based on the capabilities determined from the enhanced universally unique identifier.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device for use with a computing resource allocation system, comprising:
   processing circuitry to process data; memory circuitry to store data;
   communication circuitry to communicate with a group agent that is communicatively coupled to the device; and
   a management engine to:
      determine, based at least in part on interaction with the processing circuitry and the memory circuitry, device information regarding one or more capabilities of the device, the device information comprising a capability identifier that is based at least in part on capability information received by the management engine during the interaction, the capability identifier being divided into segments such that at least one segment corresponds to a capability table comprising one or more entries that describe the one or more capabilities;
      determine a universally unique identifier associated with the device;
      generate an enhanced universally unique identifier by incorporating at least part of the device information into the universally unique identifier; and
      cause the communication circuitry to transmit the enhanced universally unique identifier to the group agent for assignment of the device to at least one group of computing resources based at least in part on the enhanced universally unique identifier.

2. The device of claim 1, wherein incorporating the at least part of the device information into the universally unique identifier includes inserting the at least part of the device information into one or more node fields within the universally unique identifier.

3. The device of claim 1, wherein the at least part of the device information comprises at least a media access control address associated with the device.

4. The device of claim 1, wherein the at least part of the device information comprises at least part of at least one central processing unit identifier associated with at least one central processing unit in the processing circuitry.

5. The device of claim 1, wherein the at least part of the device information is generated by the management engine.

6. The device of claim 1, wherein the one or more capabilities of the device include at least one of processing capabilities, memory capabilities, input/output capabilities, manageability features or board-related features.

7. The device of claim 1, wherein the group agent is to:
   determine one or more device capabilities associated with the device based on the enhanced universally unique identifier; and
   assign the device to the at least one group of computing resources based at least in part on the determined one or more device capabilities.

8. A method for communicating device capability information, comprising:
   determining, based at least in part on interaction with processing circuitry and/or memory circuitry of a device, device information regarding one or more capabilities of the device, the device information comprising a capability identifier divided into segments, at least one segment corresponding to a capability table comprising entries describing the one or more capabilities of the device;
   determining a universally unique identifier associated with the device;
   generating an enhanced universally unique identifier by incorporating at least part of the device information into the universally unique identifier; and
   transmitting the enhanced universally unique identifier to a group agent communicatively coupled to the device for assignment of the device to at least one group of computing resources based at least in part on the enhanced universally unique identifier.

9. The method of claim 8, wherein incorporating the at least part of the device information into the universally unique identifier comprises inserting the at least part of the device information into one or more node fields within the universally unique identifier.

10. The method of claim 8, wherein the at least part of the device information comprises at least a media access control address associated with the device.

11. The method of claim 8, wherein the at least part of the device information comprises at least part of at least one central processing unit identifier associated with at least one central processing unit in the device.

12. The method of claim 8, wherein the capability identifier is generated in the device.

13. The method of claim 8, further comprising:
   determining one or more device capabilities associated with the device based on the enhanced universally unique identifier; and
   assigning the device to the at least one group of computing resources based at least in part on the determined device capabilities.

14. A non-transitory machine-readable medium having stored thereon, individually or in combination, instructions that when executed by one or more processors result in the following operations for communicating device capability information, comprising:
   determining, based at least in part on interaction with processing circuitry and/or memory circuitry of a device, device information regarding one or more capabilities of the device, the device information comprising a capability identifier that is based at least in part on capability information received by the management engine during the interaction, the capability identifier being divided into segments such that at least one segment corresponds to a capability table comprising one or more entries that describe the one or more capabilities: determining a universally unique identifier associated with the device; generating an enhanced universally unique identifier by incorporating at least part of the device information into the universally unique identifier; and transmitting the enhanced universally unique identifier to a group agent communicatively coupled to the device for assignment of the device to at least one group of computing resources based at least in part on the enhanced universally unique identifier.

15. The medium of claim 14, wherein incorporating the at least part of the device information into the universally unique identifier comprises inserting the at least part of the device information into one or more node fields within the universally unique identifier.

16. The medium of claim 14, wherein the at least part of the device information comprises at least a media access control address associated with the device.

17. The medium of claim 14, wherein the at least part of the device information comprises at least part of at least one central processing unit identifier associated with at least one central processing unit in the device.

18. The medium of claim 14, wherein the capability identifier is generated in the device.

19. The medium of claim 14, further comprising instructions that when executed by the one or more processors result in the following operations:

determining, by the group agent, one or more device capabilities associated with the device based on the enhanced universally unique identifier; and assigning, by the group agent, the device to the at least one group of computing resources based on the determined one or more device capabilities.

* * * * *